United States Patent
Bernasch et al.

(10) Patent No.: US 12,197,662 B2
(45) Date of Patent: Jan. 14, 2025

(54) COMPUTER MOUSE WITH INTEGRATED HINGED HAND REST

(71) Applicants: Timothy Frank Bernasch, Etobicoke (CA); Ahmed Abdullahi Omar, Etobicoke (CA)

(72) Inventors: Timothy Frank Bernasch, Etobicoke (CA); Ahmed Abdullahi Omar, Etobicoke (CA)

(*) Notice: Subject to any disclaimer, the term of this patent is extended or adjusted under 35 U.S.C. 154(b) by 0 days.

(21) Appl. No.: 17/882,500

(22) Filed: Aug. 5, 2022

(65) Prior Publication Data
US 2024/0077961 A1    Mar. 7, 2024

Related U.S. Application Data

(60) Provisional application No. 63/231,101, filed on Aug. 9, 2021.

(51) Int. Cl.
*G06F 3/039*    (2013.01)
*G06F 3/0354*    (2013.01)

(52) U.S. Cl.
CPC .......... *G06F 3/039* (2013.01); *G06F 3/03543* (2013.01); *G06F 2203/0333* (2013.01)

(58) Field of Classification Search
None
See application file for complete search history.

(56) References Cited

U.S. PATENT DOCUMENTS

| | | | |
|---|---|---|---|
| 5,433,407 A | 7/1995 | Rice | |
| 5,913,497 A * | 6/1999 | Myers | G06F 3/0202 248/118.5 |
| 6,157,370 A * | 12/2000 | Kravtin | G06F 3/03543 248/118.1 |
| 8,451,225 B2 * | 5/2013 | Loomis | G06F 3/039 248/118.1 |
| 8,998,153 B2 | 4/2015 | Lucas | |
| 9,927,890 B1 | 3/2018 | Perlman | |
| D861,008 S * | 9/2019 | Yeheskel | D14/460 |
| 2003/0169236 A1 * | 9/2003 | Crocker | G06F 3/0202 345/168 |
| 2005/0253805 A1 * | 11/2005 | Kennedy | G06F 3/039 345/156 |
| 2012/0073481 A1 | 3/2012 | Scott | |

* cited by examiner

*Primary Examiner* — Amare Mengistu
*Assistant Examiner* — Sarvesh J Nadkarni

(57) ABSTRACT

An ergonomic hand support device reduces stress and helps to prevent strain when using a computer pointing device. Attaching the hand support to the mouse with a hinge allows the mouse to lift up off of the surface while the wrist is still being supported.

3 Claims, 8 Drawing Sheets

FIG.3
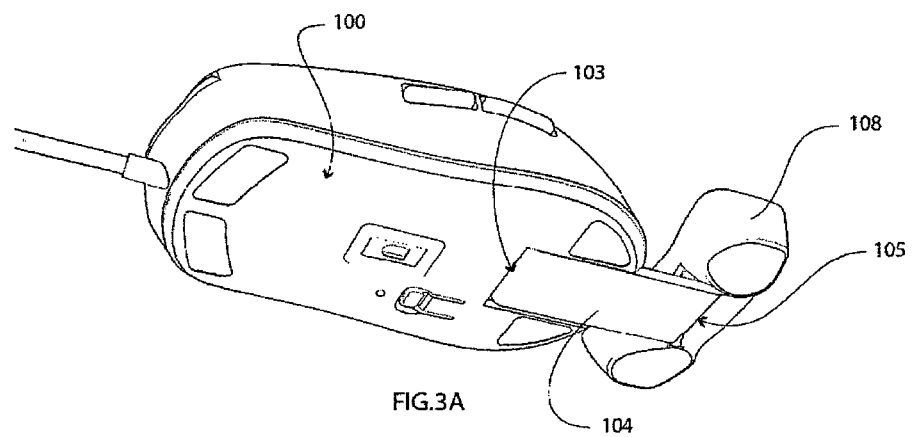
FIG.3A
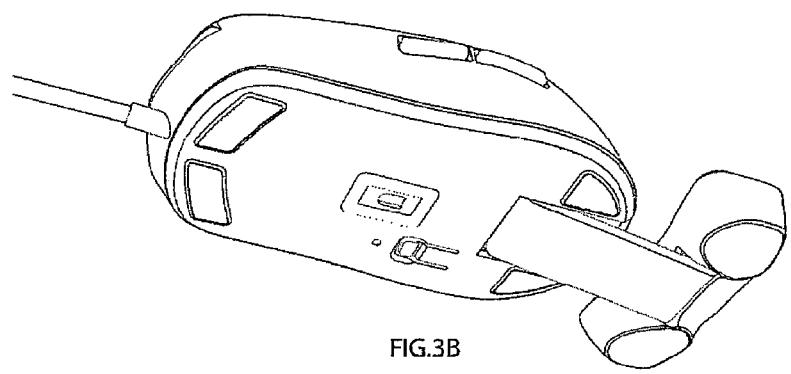
FIG.3B

COMPUTER MOUSE WITH INTEGRATED HINGED HAND REST

CROSS REFERENCE TO RELATED APPLICATIONS

None.

FEDERALLY SPONSORED RESEARCH

None.

SEQUENCE LISTING

None.

BACKGROUND

This invention relates to computer mice and specifically to ones which include a rest for the wrist or palm. Many video game players wish to play video games on PC computer hardware instead of consoles, which means they have to use a mouse for many hours continuously. This can cause wrist strain or even injury when the position of the wrist or palm is not relaxed. There are many hundreds of examples of wrist or palm rest devices intended to help ease wrist strain while using a computer mouse. However none of them address the specific issues of professional or even casual computer gaming. Gainers need to be able to make very fast movements, also very long movements, and they also need to be able to lift the mouse up to re-center it, many times per minute.

Most designs of the past have been devices that sit on a table top surface, for example <U.S. Pat. No. 5,490,647A>, or other common designs that are shaped like "a mouse pad with a hump". While this design does support the wrist or palm, it has the obvious disadvantage of being stationary and not coupled to the mouse. When the mouse is moved, the wrist or palm rest part gets closer or farther away and it does not support the wrist or palm as well. The constant friction can cause irritation. Furthermore, it is a physical barrier to the mouse. There is only a small "sweet spot" where the wrist rest actually performs ergonomically and in other positions it does not work well.

Some designs like <U.S. Pat. No. 8,998,153B2> have been designed to attach directly to the wrist or palm like a bracelet. This has the one advantage of putting the rest exactly where it is needed. But encircling the wrist or palm with a strap can cause perspiration and irritation and also the bracelet may interfere with other activities like using a keyboard. Also, users who wear a wristwatch may have to remove it to use the mouse rest which is a large disadvantage, especially as smart watches become more popular.

There is another widely available style of mouse wrist or palm rest that is attached to nothing at all. They can be described as "floating" and they are kept in the correct place only by the downward pressure of the user's wrist or palm. This technically works because the wrist naturally almost always has some slight downward pressure. The obvious disadvantage is that it is very easy for it to move out of the correct position since it is literally not attached to anything. It is actually very easy for it to move out of position when making quick movements in opposite directions. This type of support might be suitable for light word processing—where movements are slow and the timing between them does not matter much. It does not matter if the rest has to be re-positioned with the other hand. For gaming however they are unsuitable since there is no time to fuss with the position or retrieve a lost rest during a game. The other hand is usually operating a keyboard.

<U.S. Pat. No. 9,927,890B1> describes a mouse that has the wrist or palm rest portion built into the body of the mouse. This is an improvement over the previously mentioned designs but it introduces a new disadvantage. Usually when gaming, the user's wrist or palm remains in contact with the table top surface while lifting the mouse. If the wrist or palm rest is rigidly attached to the mouse, the mouse will be pinned down to the table and it will be difficult to lift.

Some video game players prefer to set their mouse movement sensitivity (also known as DPI) and in-game sensitivity as low as possible. The DPI number describes the number of pixels the cursor moves for every inch the mouse moves. When the number is low, it increases the precision when making very small movements in the game.

Sometimes the on screen cursor must move by only one or two screen pixels. When playing something that requires precise aiming, a sensitive mouse is not a good idea. With such a mouse, to aim properly requires more effort to precisely control the mouse. When quickly moving short distances, lower sensitivity can help to avoid 'overshooting' a target. Put another way, it is easier to move the mouse by exactly one pixel if it moves fewer pixels per inch.

Lower sensitivity also smooths out the natural twitches and micro-adjustments humans can't help but make while playing. Given that each player has the skill to make some "shortest possible movement", dividing the DPI in half will also halve the size of the minimum movement, which instantly increases the 'resolution' of your aim without having to gain more skill through practice.

However there is a tradeoff. Lowering DPI and in-game sensitivity also affects large movements. In general all movements become physically longer paths on the mouse surface when DPI is lower. Sometimes the gamer might want to move the cursor across the entire screen while browsing menus, or make some kind of movement in the game that is thousands of pixels high or wide. In this case the mouse must be moved a very long distance. The lower the sensitivity, the longer the distance, in practice such a movement at low DPI might be 12 inches from left to right in order to spin the character 180 degrees in an FPS, for example. Such a movement might be larger than the mouse surface, or move off the edge—especially if the mouse did not start at the opposite edge of the mouse surface. This then requires the player to pick up the mouse just high enough to disable its tracking, transport it to a different area of the mouse surface, place it back down, and resume playing. All gamers have learned to do this automatically since the mouse cannot be moved outside of the mouse surface (often a raised rubber pad that would cause movement errors when the mouse crosses the edge).

In practice, gamers or pro players using low DPI settings tend break very long movements down into a series of shorter movements with very low lift. It is very important to the gamer to be able to lift the mouse, carry it to a new position, and resume playing as quickly as possible. At high levels of competition, milliseconds matter.

There are two kinds of ways the mouse might be moved: one way for longer movements is when the wrist or palm remains in contact with the desk surface but reduces pressure slightly to slide across the surface. This involves moving the whole arm. The second way, for shorter movements, is when the wrist or palm remains in the same position on the surface and only the hand moves, with no movement of the arm. In either case, the wrist or palm does not actually fully lift off the surface and the user always experiences the sensation of touching the surface, whether or not the mouse is being lifted or dragged.

U.S. Pat. No. 9,927,890B1 will require the gamer to lift the whole mouse and wrist rest together. It does not support the second type of movement where the wrist or palm remains pressed against the surface. Because of the rigid attachment, the wrist or palm will pin the whole mouse down to the table, and it cannot be moved in a natural way.

Even the first type of movement where the wrist is sliding across the surface is impacted. Sometimes the mouse has to be lifted up high enough to stop tracking, and due to the rigid attachment of U.S. Pat. No. 9,927,890B1 the wrist has to be lifted up that high too, which leaves it in a "floating" position with no contact to the surface. This can actually cause additional wrist strain as it is natural to keep the wrist lightly in contact with the surface when sliding. Keeping the wrist or palm planted on the surface provides additional control and helps prevent placing the mouse down too hard at the end of a movement.

Furthermore, the mouse of U.S. Pat. No. 9,927,890B1 creates a problem when the mouse is being placed down after a movement. It is unlikely that the mouse will be placed down at a perfectly flat angle. Usually one side of the mouse hits the surface first, and then the mouse "slaps" down onto the surface. This is unavoidable, but with U.S. Pat. No. 9,927,890B1 the effective length of the mouse is twice as long and this causes a larger slapping effect. Also the tendency to want to drag the wrist rather than "flying" freely through space in a perfectly horizontal pose only increases the initial slapping angle leading to an even larger slap.

SUMMARY

According to the principles of this invention, an ergonomic hand support device reduces stress and helps to prevent strain when using a computer pointing device. Attaching the support to the mouse offers advantages but also disadvantages that were not previously overcome. The ability to lift the mouse up off of the desk while the wrist is still being supported is facilitated by the addition of a hinge.

Embodiments of the present invention provide a device and a method of supporting the wrist or palm of someone who is using a computer mouse, even when the mouse is being lifted. The wrist or palm rest is attached to the mouse with a hinge which allows the mouse to be lifted off of the table top surface without lifting the wrist. Accordingly, several advantages are to provide a more ergonomic computer experience, especially when using demanding applications, including but not limited to video games, that require a wide range of motion.

In one of the preferred embodiments of this invention, the hinge is a rigid linkage in the form of but not limited to a box, rod, or plate that is attached to the mouse body and wrist support so that it can rotate on a single axis, similar to how a door hinge operates.

In another of the preferred embodiments of the invention the hinge material is flexible, this allows a greater range of motion without adding complexity to the hinge. Flexibility allows customization of the range of motion by changing the hinge material and thickness. Some users may prefer the increased freedom of motion and find it more comfortable while others may prefer a more rigid attachment.

The hinge may also be composed of more than one section in order to create a greater degree of freedom while still restricting relative motion of the rest and mouse on certain axes. In some embodiments it may be able to be changed out for different designs of hinge to customize aspects of its operation, such as the distance between the mouse and rest in the resting position and the degree of freedom. The rest might even be completely removed to use the mouse on cramped or curved surfaces such as the user's own leg or a couch The preferred features described above can be used in any one of a number of combinations.

BRIEF DESCRIPTION OF DRAWINGS

FIG. 3 shows a bottom view of one embodiment of the hinge which is composed of a single solid section with rotating attachment on either end, and also a view of that hinge fully extended

DETAILED DESCRIPTION

Figure 1:
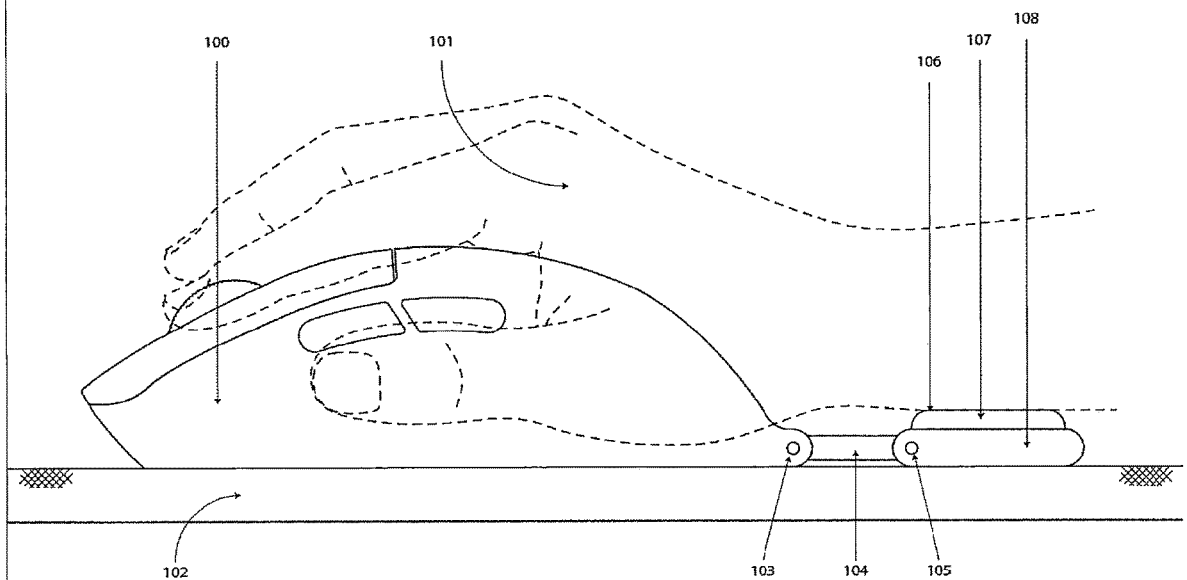
FIG. 1 shows a side view of one possible embodiment in the "down" position including the normal hand position of the user

FIG. 1 shows one possible embodiment of a computer mouse with a hinged wrist or palm rest. The users' hand (101) rests on the mouse (100) and the wrist or palm (106) is supported or elevated by the wrist or palm rest (107,108), which rests on the mouse surface (102). The rest typically comprises a bottom portion (108) which slides easily on the desk surface, and a top portion (107) which is comfortable to touch. Embodiments may have a PTFE coating or sticker or equivalent low fiction material on the bottom portion for sliding performance, and a fabric or gel material on the top portion for maximum human comfort. The mouse body (100) is connected with a rotating hinged joint (103) to a hinge section (104) which is attached with a second hinge joint (105) to the rest base (108), thereby coupling the mouse (100) and wrist or palm rest (107,108) in a way that constrains the relative motion between them.

When the mouse moves across the surface (102), the mouse (100) and rest (106,107) move together as one piece. The wrist or palm (106) is supported at all times.

Figure 2:
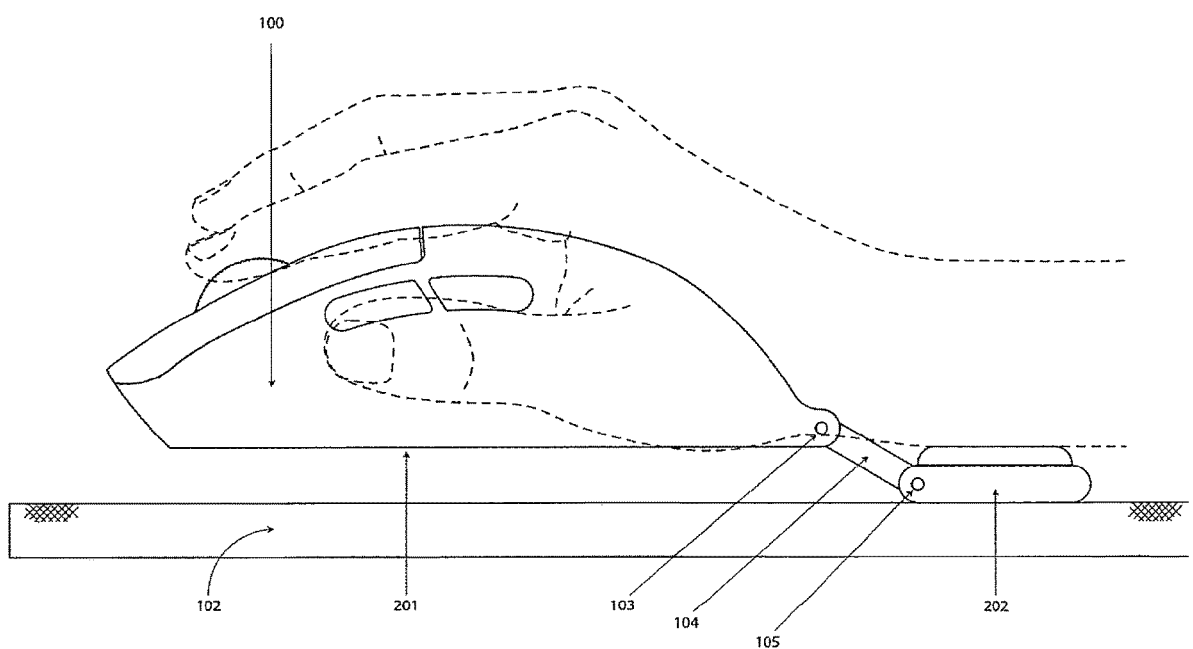
FIG. 2 shows the same embodiment as FIG. 1 in the "lifted" position, demonstrating an advantage that the wrist remains against the desk and supported while the mouse completely leaves the desk surface

FIG. 2 shows the same embodiment as FIG. 1, but in the lifted position. The mouse body (100) has a bottom surface (201) which is lifted off of the mouse surface (102). The mouse surface is often a mat meant for that purpose but it may also be the surface of a desk or any other surface, the most important feature being that the mouse can track it with its sensor. The mouse (100) is necessarily lifted until it stops tracking the surface (102) so that it can be moved without affecting the on-screen cursor (not shown). A first rotating joint (103) links the mouse to a hinge section (104) which is attached with a second rotating joint (105) to the wrist or palm rest (202). Due to the rotation of the hinge, the wrist or palm rest (202) remains in full contact with both the desk surface (102) and the user's wrist or palm (106) at all times even though the mouse has been lifted. Some examples of hinge joints are in FIG. 8.

FIG. 3A shows an embodiment from the bottom. FIG. 3B shows the same device as FIG. 3A with the hinge extended to show the lifting motion. The mouse body (100) is connected to a hinge section (104) by means of a rotating hinge joint (103). The other end of the hinge (104) is attached with another rotating joint (105) to the wrist or palm rest (106). This embodiment uses a 1-axis hinge for both sides of the hinge (103,105). The hinge plate may be composed of a rigid material or a slightly flexible material, some examples are plastic, rubber, metal, wood or plant fiber, but it could be any material that provides the correct mix of strength and flexibility, according to the needs of the design.

Figure 4:
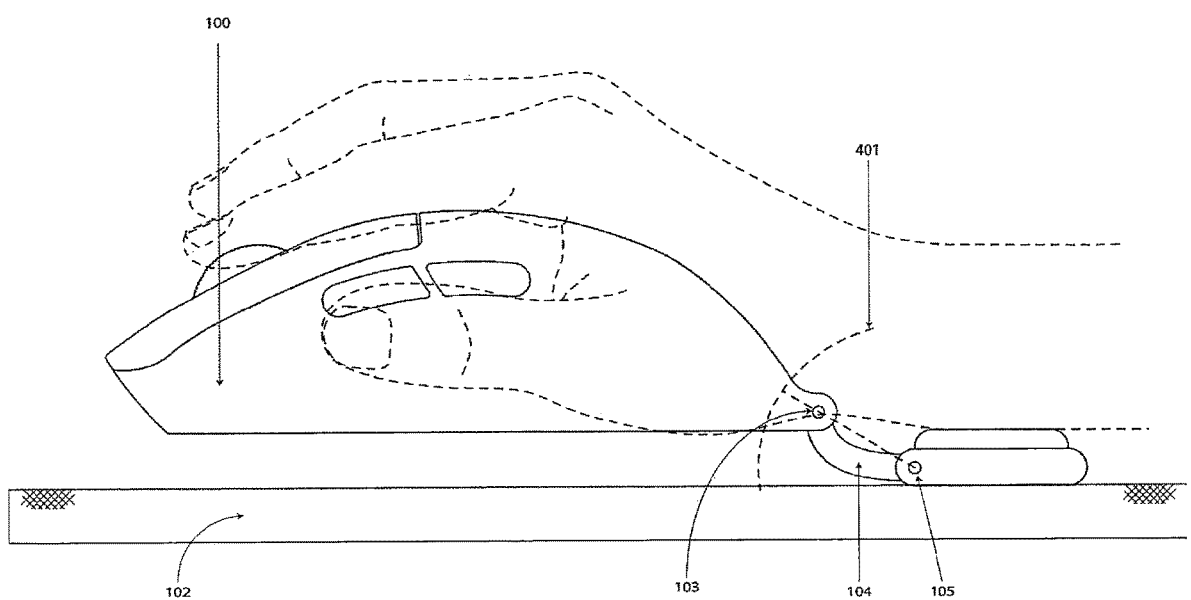
FIG. 4 shows a possible embodiment where the hinge is composed of a flexible material and also is attached with rotating joints

FIG. 4 shows an embodiment where the hinge (104) is composed of a flexible material. It is attached to the mouse body (100) with a rotating joint (103) at one and another rotating joint (105) at another opposite end. The ability to flex gives the mouse more freedom of motion, rather than constraining the mouse to move on a perfectly circular arc (401), which is the constraint provided by a hinge assembly with two 1-axis rotating joints and rigid parts. In this drawing the mouse has been moved off of the perfectly circular arc which would be provided by a perfectly rigid hinge plate, which is facilitated by the flexing of the hinge plate.

Figure 5:
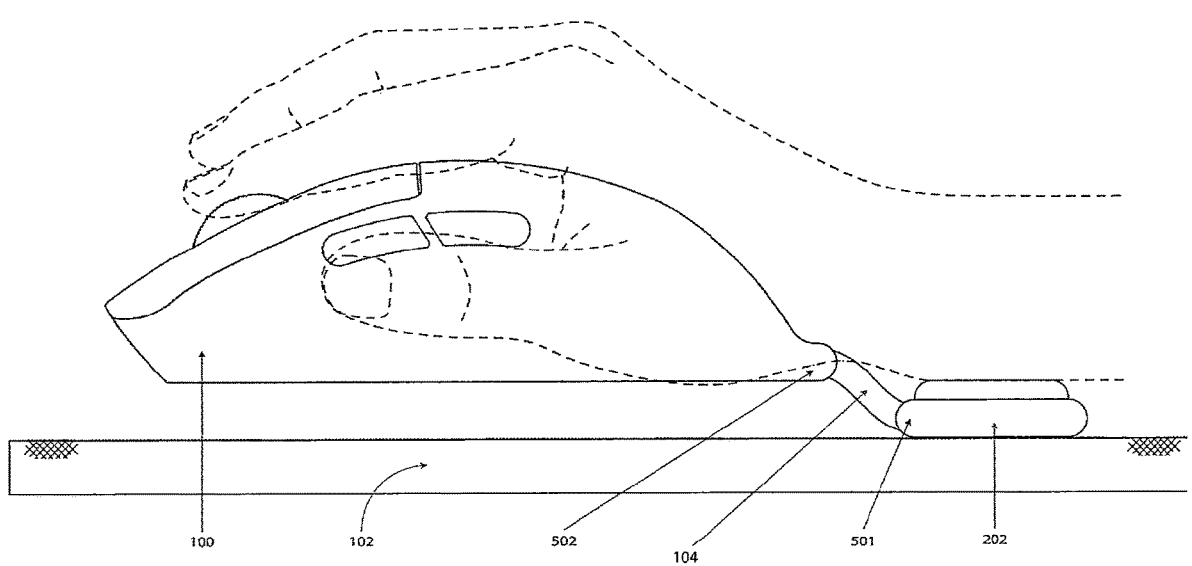
FIG. 5 shows a possible embodiment where the hinge is flexible and the attachment points are rigid, so that the movement of the mouse relative to the wrist or palm rest is achieved only through deformation of the hinge material. One such embodiment might employ a so called "living hinge" where the entire device from the mouse part to the rest part made from a single piece of material with varying thickness to achieve engineered flexibility.

FIG. 5 shows another embodiment where the mouse body (100) is attached to the wrist or palm rest (202) with a flexible link that is attached between the mouse body (100) and wrist or palm rest (202) with a non-rotating linkage at either end (501, 502). The mouse can be lifted off the surface (102) because of the flexibility of the link only. By controlling the geometry of the flexible link, the freedom to bend along various axes can be controlled. Some embodiments may use a wide flat link section to approximate the motion of a hinge with rotating joints.

Figure 6:
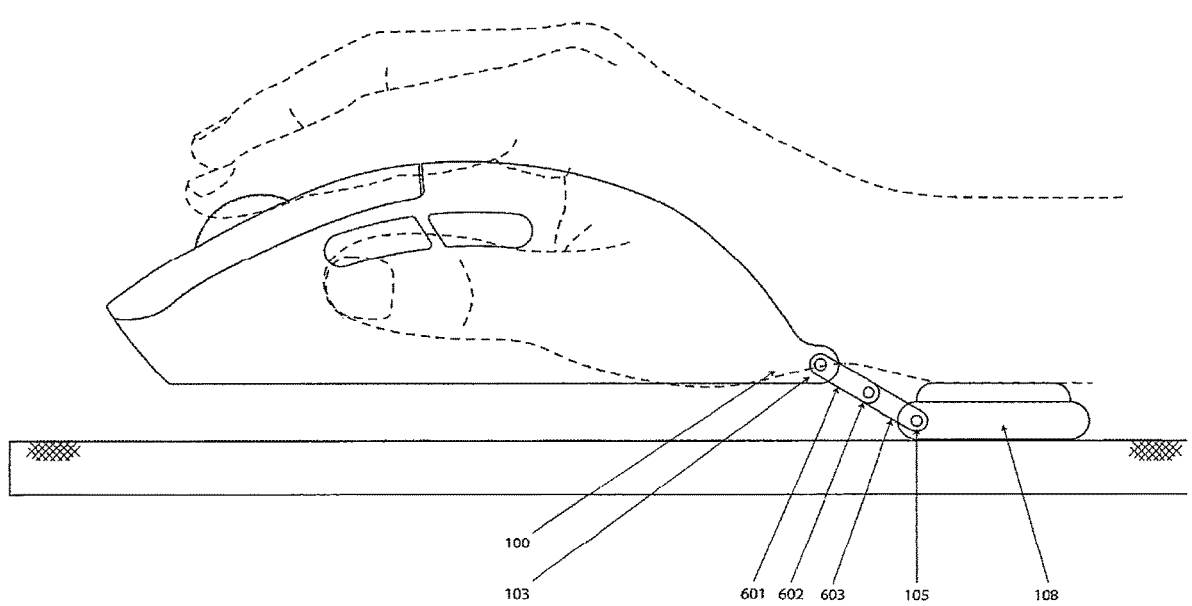
FIG. 6 shows a possible embodiment which is similar to the one from FIG. 1, except there are multiple hinge links which have rotating joints between them

FIG. 6 shows an embodiment with multiple hinge links. Using two or more hinge sections is another way to allow more freedom than the circular arc provided by a single link. The mouse body (100) is connected with a rotating joint (103) to a first hinge link (601), a middle rotating joint (602), a second hinge link (603) and a rotating joint (105) attached to the base of the rest (108).

Figure 7:
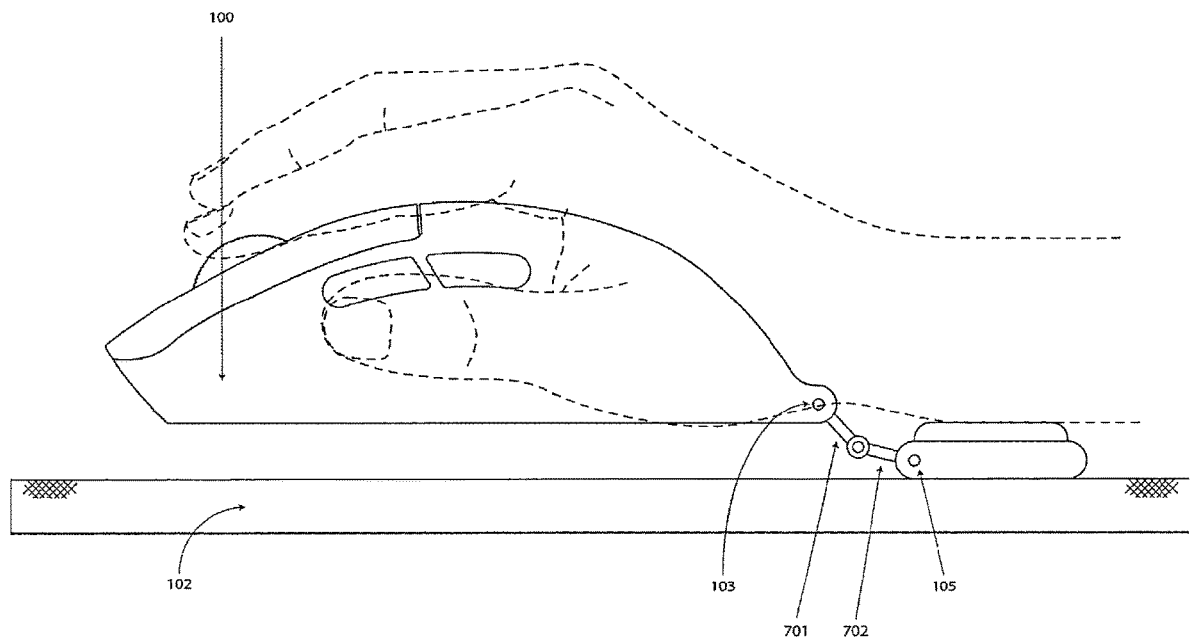
FIG. 7 shows a variation on the embodiment from FIG. 6 but the multiple hinge links are also flexible FIG. 8 (a,b,c) shows several embodiments of hinges that have been designed to have 3, 1 and 2 axes of rotation, respectively. These embodiments are simply examples of how hinges can be chosen with different degrees of freedom and are not meant to restrict the preferred type of hinge in any way
Figure 8:
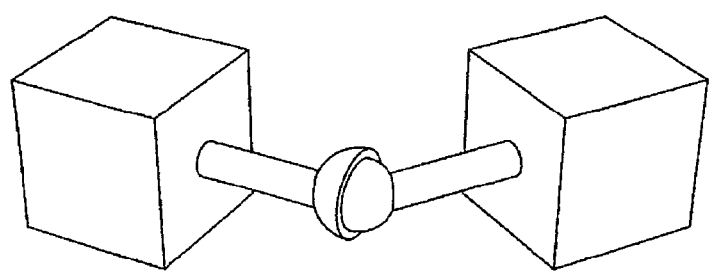
Figure 8:
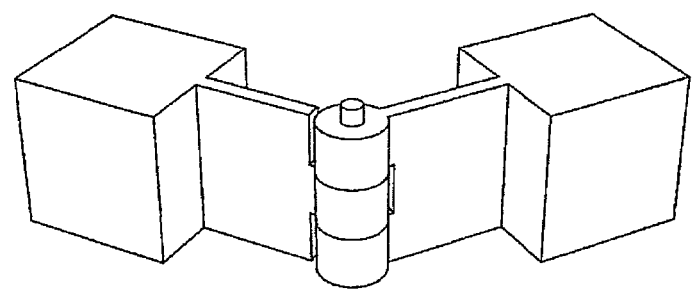
Figure 8:
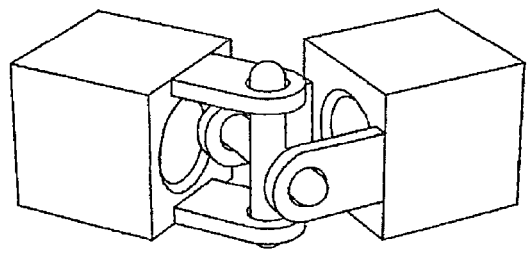

FIG. 7 shows an embodiment that physically has the same shape as FIG. 6, but the hinge links (701, 702) are made of a flexible material FIG. 8 (a,b,c) shows some examples of hinges that are free to rotate in 3, 1, and 2 axes, respectively. These are just examples of how hinge joints can be constructed in such a way to have certain degrees of freedom.

Operation

When the mouse (100) is dragged across the surface (102), the wrist or palm rest (202) follows it while supporting the wrist or palm (106) of the user. When the mouse needs to be lifted up off of the surface (102), the hinge will rotate or flex, allowing the motion to take place without lifting the wrist or palm up off of the wrist or palm rest, or lifting the wrist or palm rest up off of the mouse surface.

The invention claimed is:

1. A computer pointing device comprising:
   a pointing device containing electronic circuits configured to control a cursor on a computing device, the pointing device being configured to be used on a horizontal surface and including a first rotatable joint disposed in a rear portion of the pointing device, the first rotatable joint having a single axis of rotation coplanar to the horizontal surface;
   a support including a second rotatable joint disposed in a forward portion of the support, the second rotatable joint having a single axis of rotation coplanar to the horizontal surface; and
   a rigid linkage attached to the first rotatable joint on a first end and attached to the second rotatable joint on a second end,
   wherein the computer pointing device is configured to be lifted vertically upwards off a horizontal surface while maintaining contact with the support on the horizontal surface.

2. The computer pointing device of claim 1, wherein the support includes:
   a lower piece having the second rotatable joint of the support; and
   an upper piece attached to an upper side of the lower piece and configured to be removed and exchanged to customize the support.

3. The computer pointing device of claim 1, wherein the linkage is composed of a material selected from the group consisting of metal, rubber, plastic, wood, and plant fiber.

* * * * *